United States Patent [19]

Lange

[11] 3,906,183

[45] Sept. 16, 1975

[54] CHAIN WELDING MACHINE

[75] Inventor: Gerhard Lange, Reutlingen, Germany

[73] Assignee: Wafios, Maschinenfabrik, Wagner, Ficker & Schmid, Reutlingen, Germany

[22] Filed: Apr. 8, 1974

[21] Appl. No.: 458,536

[30] Foreign Application Priority Data

Apr. 7, 1973 Germany.............................. 2317691

[52] U.S. Cl.................................... 219/51; 219/52
[51] Int. Cl................................................. B21l 3/02
[58] Field of Search.................................. 219/51, 52

[56] References Cited
UNITED STATES PATENTS

| | | | |
|---|---|---|---|
| 2,288,494 | 6/1942 | Speed et al. | 219/51 |
| 2,684,422 | 7/1954 | Esser et al. | 219/51 |
| 3,116,404 | 12/1963 | Esser | 219/51 |
| 3,175,353 | 3/1965 | Coffey | 219/51 X |
| 3,193,655 | 7/1965 | Kleine-Weischede | 219/51 |
| 3,551,633 | 12/1970 | Wattler et al. | 219/51 |

*Primary Examiner*—J. V. Trune
*Assistant Examiner*—N. D. Herkamp
*Attorney, Agent, or Firm*—Wigman & Cohen

[57] ABSTRACT

This invention relates to a chain welding machine for the resistance butt welding of interlinked chain links bent into the shape of a C, with a saddle for supporting the link to be welded and, disposed in the same guide plane, two guide supports inclined with respect to the horizontal, to support the unwelded chain links which are interlinked with the chain link which is to be welded, with two compression levers pivotable about parallel axes by a control shaft through at least one drive means, and with, guided horizontally in aligned straight guides and coupled to these compression levers, two tool carriers for compression tools which are to engage on the rounded portions of the chain link which is to be welded, the compression tools moving in opposite directions while the compression levers are being pivoted in opposition to each other.

26 Claims, 7 Drawing Figures

CHAIN WELDING MACHINE

BACKGROUND OF THE INVENTION

This invention relates generally to the welding art, and more particularly to a chain welding machine for the resistance butt welding of interlinked chain links bent into a C-shape.

A machine of this type is disclosed in U.S. Pat. No. 1,310,554. In the case of the known machine, two drive means are provided which are substantially symmetrically constructed with respect to a plane which extends parallel with the axes of the compression levers in the center between these and at right angles to the guide plane. Each of the drive means has, mounted on the control shaft, a circularly cylindrical cam roller having an encircling annular groove into which engages a wheel mounted to be freely rotatable at the adjacent end of the associated compression lever. The groove has two portions of considerable pitch. When the wheel is positively guided in these portions, the associated compression tool performs a fast forward or reverse stroke which brings it rapidly to bear on the chain link which is to be welded or moves it rapidly away from the chain link which has just been welded. Each of the two grooves moreover has extending substantially in the peripheral direction of the cam roller, a relatively short portion which is traversed by the associated wheel when the welding electrodes are applied against the ends of the chain link which is to be welded, and adjacent to which there is a similarly short and axially slightly bulbous portion which is associated with the final compression stage.

In order that the compression levers can exert the required compressing force on the chain link which is to be welded, their arms which are coupled to the compression tools are many times shorter than the arms which carry the wheels which engage in the grooves. Therefore, although the wheels are, by the portions of the grooves associated with the final compression process, subject to a deflection in the direction parallel with the control shaft and which is greater than the final compressing travel of the compression tools, this is not by any means sufficiently great for the groove pattern in the region of the said portion to be as accurately fixed as is required, in view of the different final travel-time charts which have to be envisaged for different chain materials and chain link dimensions in order to achieve perfect welding.

SUMMARY OF THE INVENTION

Hence, in view of the foregoing, it should be apparent that there is a need for a chain welding machine of the type discussed above in which, in all phases, the compression tools perform an exactly timed predetermined compression movement, which is the prerequisite of the ends of the chain links being welded in constantly good quality. It is, therefore, a primary object of this invention to provide a chain welding machine in which the non-productive strokes of the compression tools (i.e., the fast forward and return strokes), and the compression stroke thereof be performed by separate drive devices.

More particularly, it is an object of this invention to provide a chain welding machine of the type herein described wherein the compression tools are moved toward each other into engagement with the ends of a chain link to be welded in a fast forward mode by means of a first cam gear, and wherein the compression tools are additionally moved toward each other in a final compression mode during welding of the link by means of a separate drive under the control of a separate cam plate and follower wheel.

Another object of this invention is to provide a chain welding machine of the type described wherein the final compression of the link can be very accurately controlled.

Still another object of this invention is to provide a chain welding machine of the type described wherein a defective positioning on the saddle of the link to be welded will result in a stoppage of the machine.

Briefly described, these and other objects of the invention are accomplished according to the invention by providing a chain welding machine in which the end of each tool carrier which is remote from the compression tool attached to it is articulated on the outer end of the first leg of a two-legged first toggle lever which can be bent and stretched in a definite plane and the second leg of which has its outer end mounted for rotation about an axis which is perpendicular to the defined plane, on a bearing rigid with the frame, and displaceable with respect to the bearing, and the knee joint of which is coupled by a connecting rod to the lever of a cam gear, the cam plate of which is mounted on the control shaft, the associated compression lever being coupled to the second leg of the first toggle lever. If the pivoting axes of the two compression levers are disposed at right angles to the generally vertical guide plane, the defined plane is identical to the guide plane.

The chain welding machine according to the invention has the decided advantage that at least one drive device for the compression levers can be constructed independently of the two cam gears for the knee joints of the toggle levers which move the compression tools in a fast traverse, so that in the case of drive devices having cam plates and followers for the compression levers, it is possible to determine the cam pattern with great accuracy such as is required for high grade welds. In such a case, approximately one-quarter of the periphery of the cam plate and not merely a substantially shorter portion, is available to control the compression process. In addition, by virtue of the fact that the transmission of the compression stroke by the compression levers can be selected to virtually any level, as desired, so the cam plate diameter can also be chosen to be correspondingly great, so that the quarter periphery of the cam plate which is associated with final compression may exhibit considerable differences with respect to radius.

It is expedient, as in the case of the chain welding machine disclosed in French Pat. No. 1,574,406, for the two compression levers to be provided with one common drive device because this guarantees the chain link not being displaced during compression and simultaneous welding. Such displacement would cause the chain link to slide under the applied electrodes, which would have disadvantageous results.

In the case of preferred forms of embodiment of chain welding machine according to this invention, it is envisaged that the two legs of each first toggle lever be constructed as H-shaped double tie bars with bifurcated ends, the outer bifurcated ends of the first double tie bar receiving that end of the tool carrier which is remote from the compression tool and being connected to it by a bolt; the inner end of the second double tie bar engaging around the inner end of the first double tie bar, or vice versa, each compression lever comprising two flat parts, plane-parallel and mirror images of each other, each of which has one short and one long arm, each of the short arms being pivoted to a flat bar disposed substantially parallel with the guidance direction of the tool holders, that end of the said flat bar which is farthest from the short arm's pivot being journalled on the pin of an associated rotary and thrust hinge, the other member of which is formed by a bearing rigid with the frame. By virtue of this obviously symmetrical arrangement, the system is made extremely stable.

Moreover, each compression lever expediently forms the first leg of a second toggle lever, the second leg of which is constructed as a tie bar which is preferably pivoted on a common slide member which is guided on two parallel rails disposed in the guidance plane. The drive device provided for the two compression levers may be a control cam gear which has a control cam plate mounted on the control shaft and a control lever which is operatively controlled by the said cam plate, the positively operated arm carrying a wheel which is mounted to rotate and follow the periphery of the control cam plate, while the other arm is spring loaded, a tie bar being advantageously articulated on the other arm of the control lever and mounted pivotably on the slide member to pivot about an axis disposed in the guidance plane.

In the preferred forms of embodiment of the machine according to this invention, it is furthermore envisaged that the pin of each rotary and thrust hinge carry the outer bifurcated end of the second double tie bar and engage through an elongated slot constructed in the rotary and thrust hinge's bearing which is fixed on the frame and which extends in a direction parallel with the guidance direction of the tool carriers, the length of the elongated slot corresponding at least to the compression stroke. In this way, the rotatability and displaceability of the second leg of each first toggle lever can be easily and reliably established.

In the case of a form of embodiment of machine according to this invention which will be the first to be described hereinafter, the two-armed lever of the cam gear has a positively moved arm which is constrained by shape to be operated by the cam plate of the cam gear. For this purpose, the cam plate has an endless groove, the oppositely disposed edges of which are followed by a wheel mounted to rotate on the positively moved arm of the lever.

In theory, it may happen that the chain link which is to be welded and which is supported by the saddle, has not been accurately positioned on the saddle due to some disturbance in the preceding feeding of the chain, so that it may, for example, be not quite seated on the saddle or may have been lifted a little above it or may be obliquely positioned on the saddle. In such a certainly conceivable case, the compression tools will not be able to engage on the rounded portions of the chain link which is to be welded and in the prescribed manner, since a condition of asymmetry obtains with respect to the central plane extending through the center of the saddle and at right angles to the guidance plane. The compression tools are not properly able to straighten up the chain link positioned on the saddle. The chain link will therefore offer an insuperable resistance to at least one of the compression tools. By virtue of the shape-constrained control of the positively moved arm of the lever of the cam gear, therefore, the compression tools may be broken or their drive damaged, so long as the compression tools are performing their forward travel. It is however also possible for the chain link which is to be welded itself to become misshapen during the final stage of the forward stroke so that its ends can no longer be accurately welded. Furthermore, there is a danger that during removal of the weld bead which follows on from welding, the burr removing tools used may be damaged.

The invention is, therefore, also based on the problem of so improving the chain welding machine according to the first form of embodiment that a defective positioning on the saddle of the chain link which is to be welded will only result in a stoppage which can be rectified, but will not cause any damage to the machine.

In the case of a second form of embodiment, this problem is resolved in that the cam plate of the cam gear is, for force-constrained control of the two-armed lever of the cam gear, constructed as an eccentric cam plate, the periphery of which is followed by a wheel mounted to rotate on the positively moved arm of the lever, and in that a single-acting pneumatic cylinder-piston assembly is provided, the piston rod of which is articulated on the free end of the lever and the cylinder of which is articulated on the machine frame, and in that the cylinder of the assembly is connected to a compressed air source at constant adjustable pressure and in that a limit switch is provided which can be mechanically actuated by the lever of the cam gear.

If, in the case of the second form of embodiment, a breakdown occurs in that the compression tools cannot completely perform their forward travel until the first toggle lever is extended, because the compression tools are opposed by a resistance which, at the lever of the cam gear, gives rise to a counter torque which is at least as great as the constant torque generated by the cylinder-piston assembly, then the eccentric cam plate moves through under the wheel on the free end of the lever, which appears to be spatially stopped, and the limit switch is not actuated. Non-actuation of the limit switch connected into the circuit of any desired per se known control arrangement can be utilized in order to cause an acoustic and/or electrical indication or better still, an immediate shut-down of the machine. The fault which has occurred can then be remedied.

So that the torque exerted on the lever of the cam gear by the cylinder-piston assembly can be easily adapted to the situation which may change from time to time or from case to case, it is envisaged in the case of a preferred form of embodiment of the machine that the compressed air source comprise an adjustable pressure reducing valve.

In the case of the second form of embodiment, there is also seated on the control shaft a switching cam which cooperates with the radially movable sensor of a fixed electrical switch. This switch may be connected in series with the limit switch in the said circuit. This series connection gives rise to a control pulse instead of a continuous signal emanating solely from the limit switch. Ideally, the switching cam has a rounded tip so that the sensing time of the electrical switch is substantially shorter than the period of actuation of the limit switch.

In the case of the second form of embodiment, a common cam gear is furthermore provided for the two first toggle levers. This not only reduces the structural costs of the drive for the first toggle lever but then, if the common cam gear has, mounted on an auxiliary shaft and coupled to the relevantly associated toggle joint via the connecting rod, two levers, of which one has two arms and can be positively operated by the single cam plate, it will be in any event also possible to save on one limit switch and one cylinder-piston assembly. Also, the switching cam on the electric switch will be required only once.

With the above and other objects in view that may become hereinafter apparent, the nature of the invention may be more clearly understood by reference to the several views illustrated in the accompanying drawings, the following detailed description thereof, and the appended claimed subject matter.

DETAILED DESCRIPTION OF PREFERRED EMBODIMENT

Figure 1:
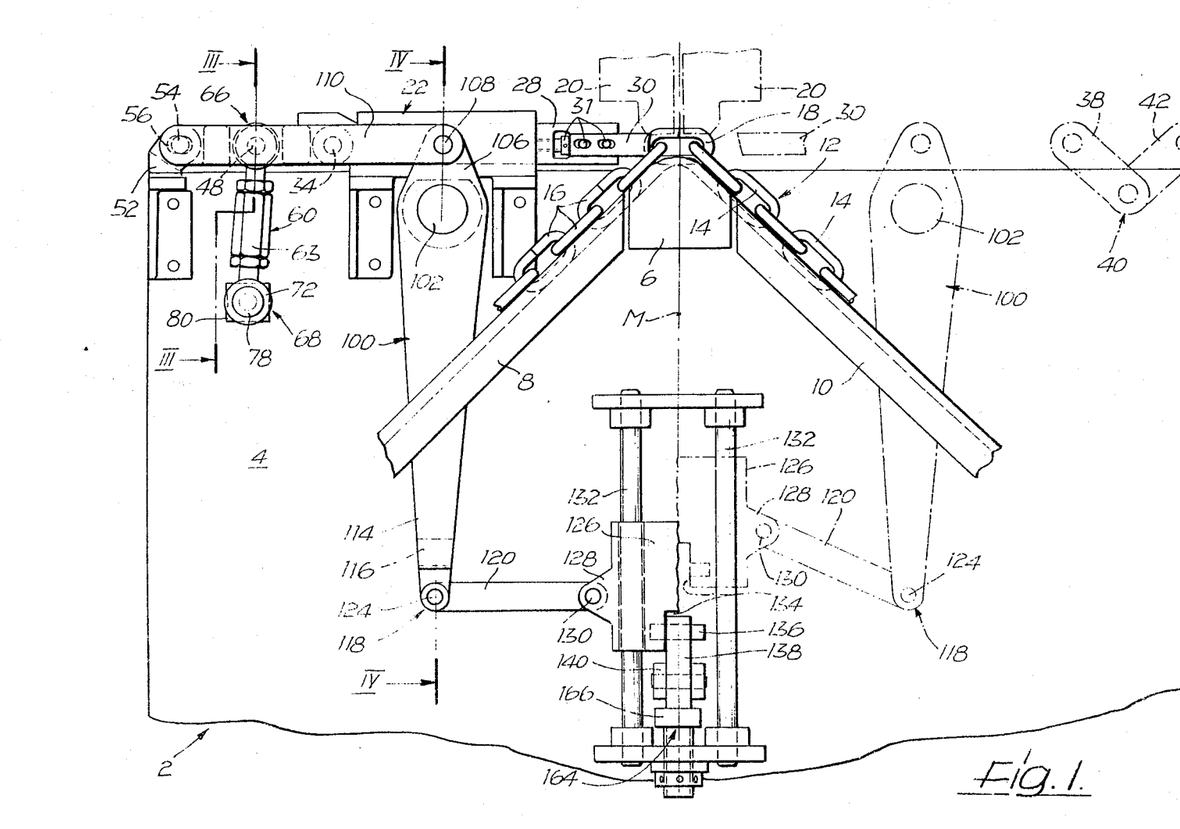
FIG. 1 is a partially diagrammatic front view of a first form of embodiment, which is incomplete by virtue of the symmetrical construction.
Figure 2:
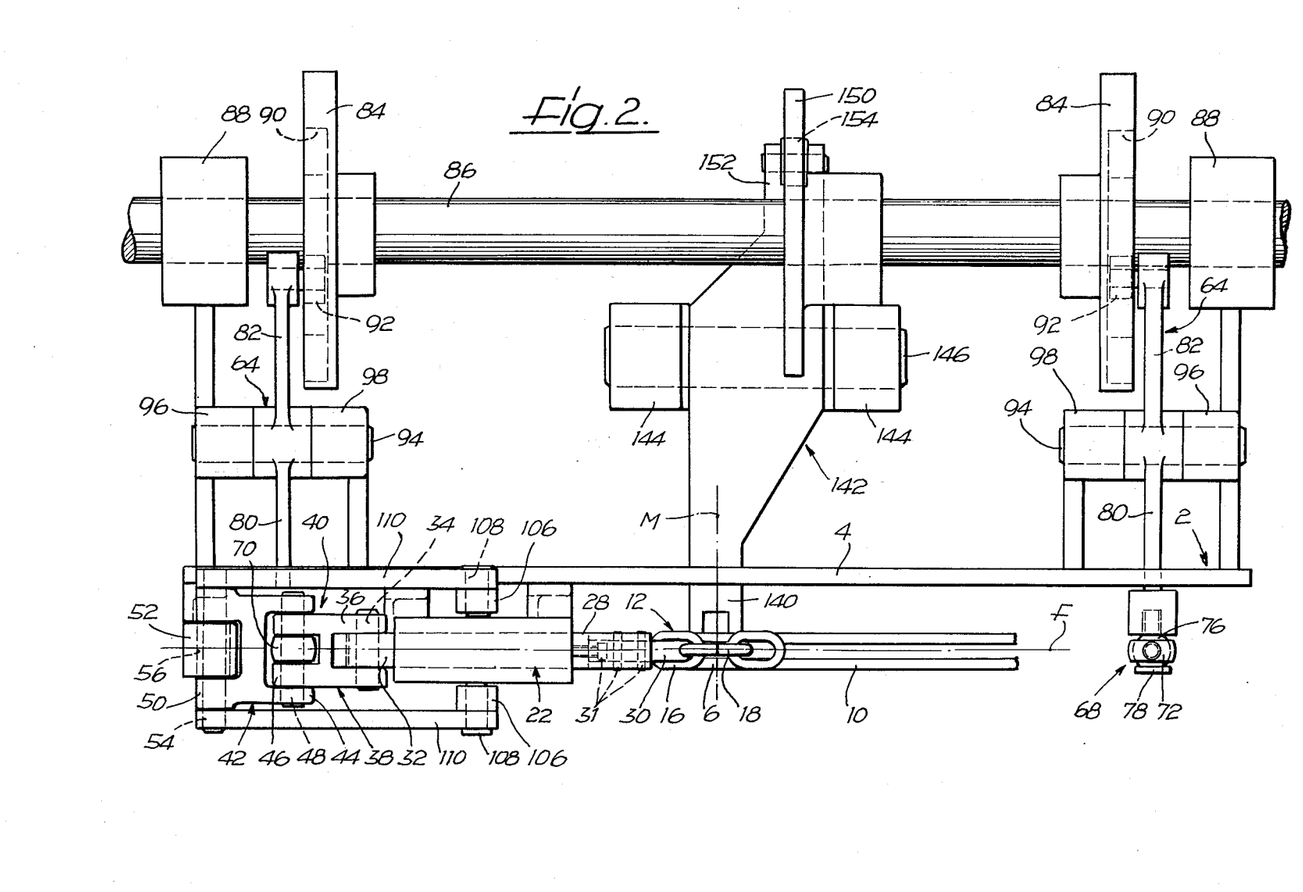
FIG. 2 is a corresponding plan view of the first form of embodiment.
Figure 6:
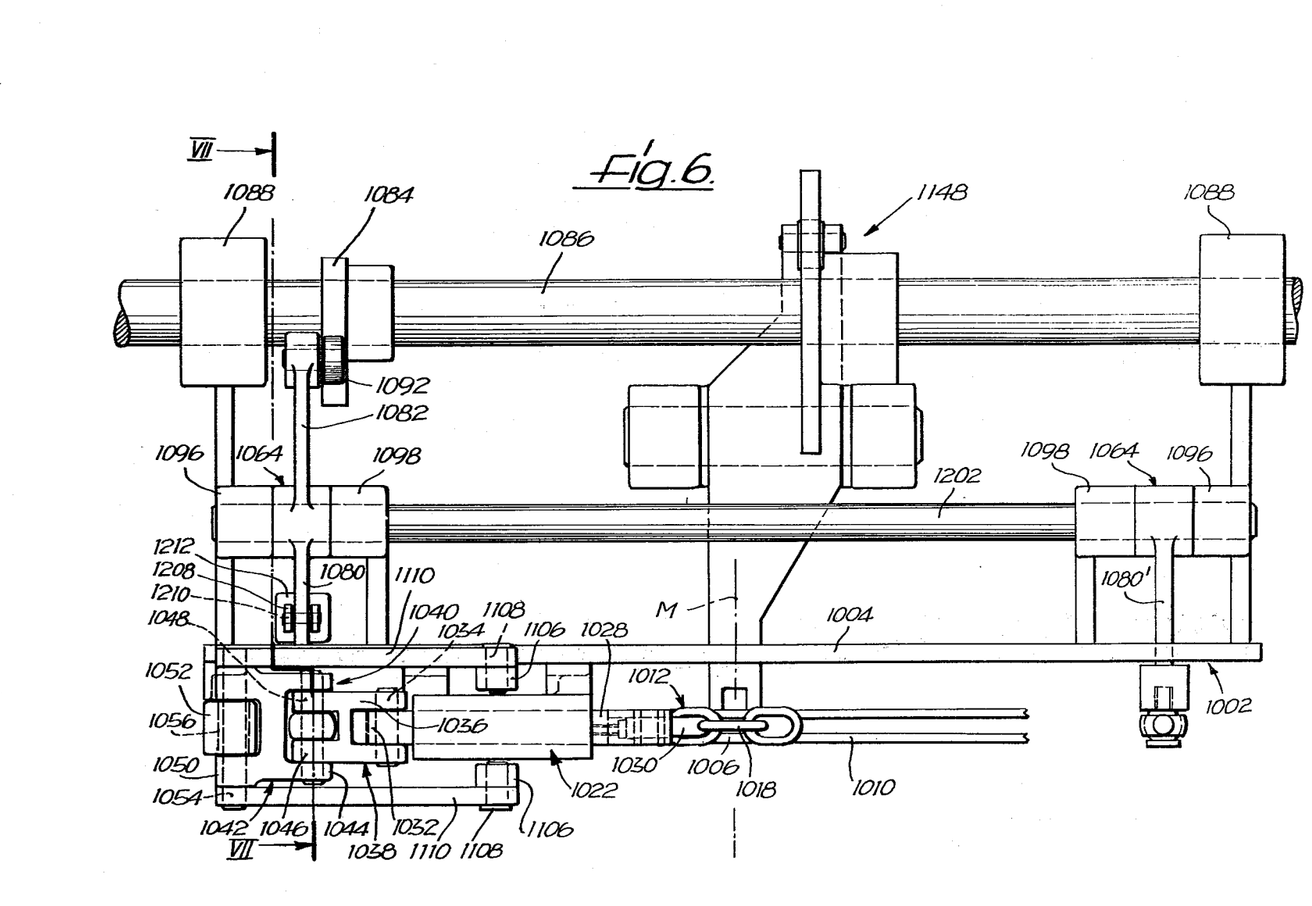
FIG. 6 is a partially diagrammatic plan view of a second form of embodiment, incompletely illustrated by virtue of the symmetrical construction.

The forms of embodiment are of substantially symmetrical construction with respect to the central plane M shown in FIGS. 1 and 6. Where symmetry exists, the description will therefore extend to only one-half of the machine but it is equally applicable to the other half thereof.

Figure 3:
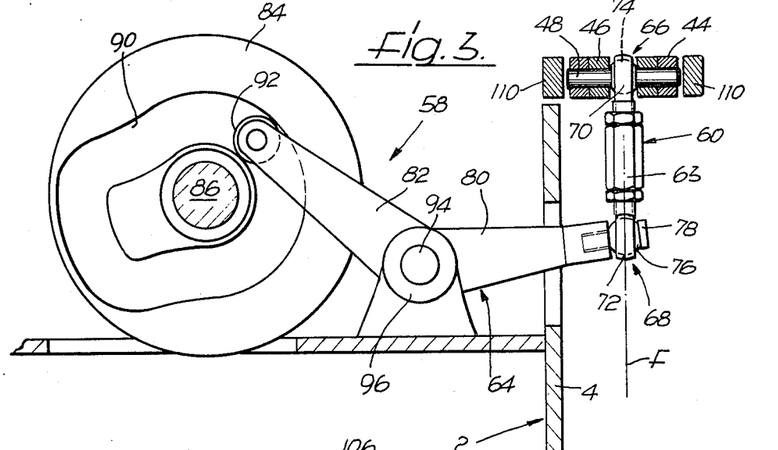
FIGS. 3 and 4 are cross-sections on the lines III-III and IV—IV, respectively, in FIG. 1.
Figure 4:
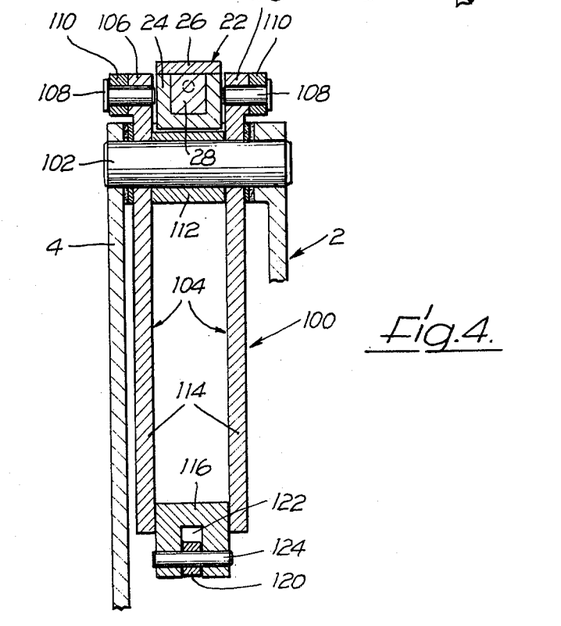
Figure 5:
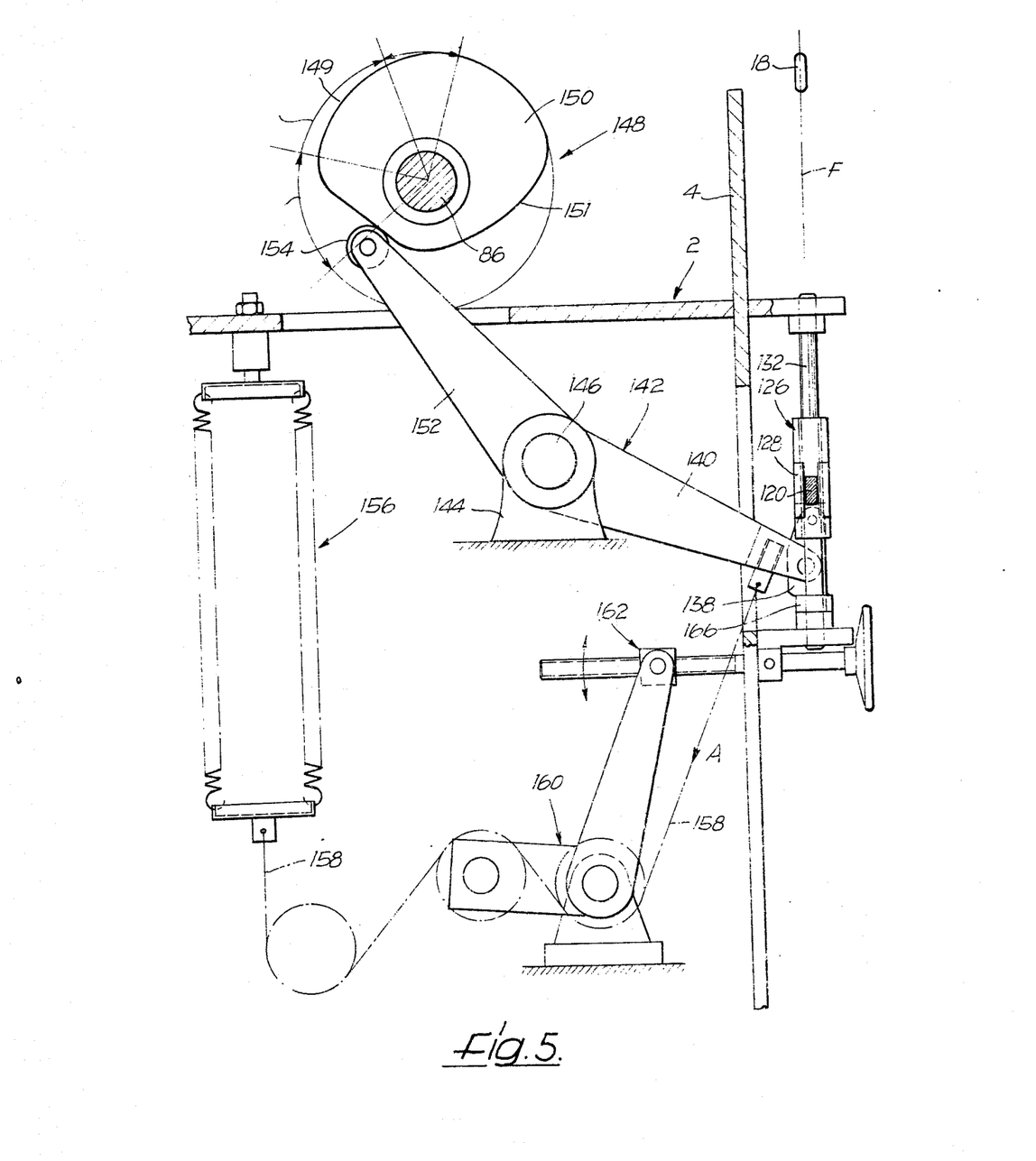
FIG. 5 is an incompletely and partially diagrammatically shown side view of the first form of embodiment.

A frame 2 of the first form of embodiment shown in FIGS. 1 to 5 comprises a vertical front panel 4, at the front top portion of which a saddle 6 is rigidly secured symmetrically with respect to the central plane M and in a vertical guidance plane F which is at right angles thereto, contiguous to which saddle 6, on either side of the central plane M, there are rails 8 and 10 inclined at 45° approximately with respect to the vertical and horizontal, and intended for feed-in and feed-out, respectively, of a chain 12, each of which carries a row of already welded chain links 14 and chain links 16 which are still to be welded, of which every second chain link disposed in the guidance plane F engages into the rail 8, 10, while the other interposed chain links lie only on the rail 8, 10, respectively. A feed device, not shown, ensures that, when the ends of the horizontal upper part of the link 18 positioned on the saddle 6 in the guidance plane F have been welded by the two welding electrodes 20, the chain is advanced by two links so that after every such feed movement the next link to be welded is duly in the position described. Aside from the central plane M, sited above each rail on a level with the chain link 18, there is a straight horizontal guideway 22 which, as shown in FIG. 4, comprises a cross-sectionally U-shaped part 24 and a plate-shaped part 26 mounted on the flanges of the part 24.

The two parts 24 and 26 form a hollow space of square cross-section to hold a tool carrier 28 of corresponding cross-section. At its first end adjacent the central plane M, each tool carrier 28 is provided with an axially adjustably mounted compression tool 30, the appropriately shaped front end of each compression tool engaging the rounded part of the chain link 18 which is directly adjacent to it, when the tool carrier 28 has completed a rapid forward stroke, which movement is immediately followed by the actual compression stroke. The outer bifurcated end 36 of a first H-shaped double tie bar 38, which forms the first leg of a first toggle lever 40 while its end 36 receives the end 32 of the tool carrier 28, is articulated on the rear end 32 of the tool carrier 28, in other words, the end remote from the compression tool 30, by means of a bolt 34 which is mounted on it. The first toggle lever 40 has, as its second leg, a second H-shaped double tie bar 42, of which the inner bifurcated end 44 engages around the inner bifurcated end 46 of the first double tie bar 38 and, together with this and a bolt 48 passed through it to establish a connection, forms the knee joint of the first toggle lever 40. The outer bifurcated end 50 of the second double tie bar 42 engages round the bearing 52 mounted rigidly on the frame and on the front panel 4, and serving as a rotary and thrust hinge which has as a further element a journal 54 carrying the end 50 and engaging through an oblong hole 56 constructed in the bearing 52 along an axis perpendicular to the guide plane F. The major dimension of the cross-section of oblong hole 56 extends parallel with the guidance direction of the tool carrier 28 and is of a length somewhat greater than the maximum length of the compression stroke required. So that the first toggle lever 40 which is disposed and constructed symmetrically with respect to the guidance plane F is not unilaterally loaded by the force which results in bending or stretching of the toggle lever, a tie rod 60 connecting the first toggle lever 40 to a cam gear 58 engages with the toggle joint in the guidance plane F. The connecting rod is made in two parts, the parts being connected to each other by a turn buckle 63. It is connected to the toggle joint and a lever 64 of the cam gear 58 through articulated couplings. Provided as articulated couplings are rod-end ball and socket joints 66 and 68, of which the rod ends 70, 72 are disposed at the ends of the connecting rod 60 and the balls 74, 76 of which are disposed on the bolt 48 of the toggle joint within the inner bifurcated end 46 of the first double tie bar 38 or on a collar bolt 78 disposed on the free arm 80 of the lever 64 of the cam gear 58. The positively moved arm 82 of the lever 64 is constrained by shape to be controlled by a cam plate 84 of the cam gear 58, mounted on an optionally continuously rotating control shaft 86 which is rotatably mounted in at least two bearings 88 on the frame 2 and which is provided with a drive, not shown. The cam plate 84 has an endless groove 90 encircling the control shaft 86 and shown in FIG. 3, the oppositely disposed edges of the groove being followed by a wheel 92 rotatably mounted on the cam-actuated arm 82. The lever 64 is pivotably mounted on a bolt 94 disposed parallel with the front panel 4 and which is in turn secured in two bearings 96, 98 rigid with the frame.

The first embodiment is provided, on each side of the central plane M, with a compression lever 100 which has restricted pivotability about an axis at right angles to the guide plane F, on a bolt 102 mounted on the frame 2. Each compression lever 100 has two spaced apart flat parts 104 having one short and one long arm, the short arms 106 being disposed on mutually remote sides of the guide 22 and being in each case articulated by a collar bolt 108 on a flat bar 110 disposed substantially parallel with the guide direction of the tool carriers 28, the end of the flat bar 110 which is remote from the associated short arm 106 being mounted on the pivot pin 54 of the rotary and thrust joint for the second double tie bar 42 of the first toggle lever 40. The distance between the two flat parts 104 is guaranteed by a sleeve 112 welded to the flat parts 104 and mounted on the bolt 102 and by a bearing block 116 of U-shape welded onto the ends of the long arms 114 of each flat part 104. Each compression lever 100 forms the first leg of a second toggle lever 118, of which the second leg is constructed as a tie rod 120. One end of the tie rod 120 engages into the intermediate space 122 formed by the bearing block 116 and is mounted to rotate on the bearing block 116, by means of a pivot 124 which, together with the bearing block 116, forms the knee joint of the second toggle lever 118. The other end of the tie rod 120 of the second toggle lever 118 is articulated by a lug 128 and a pivot 130 on a slide member 126 which is common to both machine halves. The slide member 126 is guided on two rails 132 disposed parallel in the guide plane F and mounted on the frame 2. Between the rails 132, the slide member 126 has on its under side a recess 134 into which a tie rod 138 mounted rotatably on the slide member 126 about an axis parallel with the guide plane F can engage. In its center, the tie rod 138 is articulated on the bifurcated end of the spring loaded arm 140 of a control lever 142 which is pivotably mounted on a bolt 146 disposed parallel with the front panel 4 in bearings 144 rigid with the frame.

The control lever 142 is part of a cam gear 148, which serves as a drive control means for the two compression levers 100. The cam gear 148 has, mounted on the control shaft 86, a control cam plate 150 which co-operates with a follower wheel 154 mounted on the bifurcated end of the positively moved arm 152 of the control lever 142 and following the periphery of the control cam plate 150, so operatively controlling the control lever 142. The spring force loading the arm 140 of the control lever 142 is applied by a bank of springs 156 through a chain 158 which can be shortened in the direction of application A by means of a tensioning device 160 having an adjusting arrangement 162.

In the event of the control cam plate 150 not or not solely determining the final minimum distance between the compression tools 30, a locked set screw 164 is provided, of which the head 166 forms an abutment for the tie rod 138 when this latter is in its lowest position which produces in the second toggle lever 118 a knee angle of less than 90°.

The first embodiment of the chain welding machine according to this invention, as described, operates in the following way: At the start of the forward stroke, the legs of the two toggle levers 40 and 118 are in the positions shown by dash-dotted lines in the right-hand half of FIG. 1, i.e., the knee angle is in each case at its smallest. Now the cam gear 58 according to FIG. 3 provides for very rapid extension of the bent toggle lever 40 into its extended position shown in the left-hand half of FIG. 1. Once this has been reached by rapid traverse in the case of both toggle levers 40, the compression tools 30, which can according to the dimensions of the chain link be exchanged and adjusted by set screws 31, are applied against the rounded portions of the chain link 18. While the compression tools 30 are performing the forward stroke, the bank of springs 156 becomes initially tensed and loaded by the rising part 151 of the control cam plate 150 which causes the control lever 140 to rotate in the counterclockwise direction. In the meantime, also the welding electrodes 20 will have been applied to the link ends which are to be welded. Upon the subsequent downward slope 149 of the control cam plate 150, the compression tools 30 are initially pressed more strongly against the chain link 18 under the force of the bank of springs 156, whereupon the welding process starts, this being accompanied in its final phase by the final compression process due to softening of the chain material. As the cycle continues, the stretched toggle levers 40 which provide the flow of force from the compression levers 100 to the compression tools 30 are again bent by the cam gear 58 so that the compression tools 30 are distant from the chain link 18 which has just been welded to a degree which allows unhampered further feeding of the chain 12.

Figure 7:
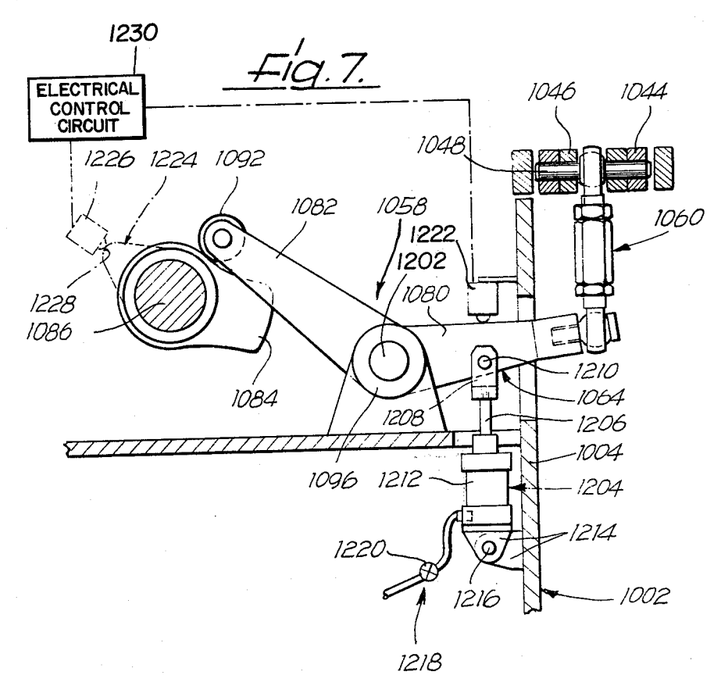
FIG. 7 is a cross-section through the second form of embodiment on the line VII—VII in FIG. 6.

The second embodiment according to FIGS. 6 and 7 conforms substantially with the first form of embodiment. Deviations are indicated hereinafter. Insofar as the second form of embodiment conforms to part of the first or has parts which correspond thereto, so these parts are identified by reference numerals which are raised by 1000. Also in the case of the second form of embodiment, a connecting rod 1060 coupling a first toggle lever 1040 to a cam gear 1058 engages the toggle joint in the guide plane F which is in turn connected by articulating couplings to the toggle joint and free arm 1080 and 1080' of two levers 1064 of a cam gear 1058. A positively moved arm 1082 of one (on the left in FIG. 6) lever 1064 is operatively controlled by a cam plate of the cam gear 1058 and constructed as a cam 1084, the cam plate being mounted on a control shaft 1086 which is rotatably mounted in at least two bearings 1088 on the frame 1002 and carrying a drive, not shown. The periphery of the cam plate 1084 is followed by a wheel 1092 mounted to rotate on the positively moved arm 1082 of one lever 1064. Both levers 1064 are mounted on an auxiliary shaft 1202 disposed parallel with the front panel 1004 and which in turn is rotatably mounted in two bearings 1096 and 1098 which are rigid with the frame. Associated with the cam gear 1058 is a single acting pneumatic cylinder-piston assembly 1204, of which the piston rod 1206 is articulated by a fork 1208 and a bolt 1210 on the free arm 1080 of one lever 1064 while the cylinder 1212 of the assembly 1204 is articulated by two angle parts 1214 and a bolt 1216 connecting these, on the front panel 1004. The cylinder 1212 of the assembly 1204 is connected to a compressed air source 1218 of constant pressure which is variable because the compressed air source has an adjustable pressure reducing valve 1220. Disposed above the free arm 1080 of one lever 1064 of the cam gear 1058 and capable of being actuated mechanically by the arm is a limit switch 1222 which is mounted on the front panel 1004. The limit switch 1222 is actuated by the arm 1080 during the period of time that the first toggle levers 1040 are extended, i.e., during the time wheel 1092 bears on the surface of cam plate 1084 having a minimum radial dimension.

Mounted on the control shaft 1086 is a switching cam 1224 which cooperates with the radially movable sensor of a rigidly mounted electric switch 1226. The switching cam 1224 has a rounded tip 1228 which briefly actuates the sensor of switch 1226 also during the period of time that the first toggle levers 1040 are fully extended. The limit switch 1222 and the switch 1226 are connected in series in electrical control circuit 1230 so that if limit switch 1222 is actuated, the brief actuation of switch 1226 by cam 1224 will cause initiation of welding current to the welding electrodes from the electrical control circuit 1230. It is to be noted that initiation of welding current can occur only when the first toggle levers 1040 have reached their fully extended position. So that this can happen, it is necessary to adjust the pressure reducing valve 1220 so that the torque exerted by the assembly 1204 on one lever 1064 is, under normal circumstances, sufficient to maintain the wheel 1092 bearing on the cam plate 1084. When the first toggle levers 1040 are bent, the compressed air contained in the cylinder 1212 is forced back into a network or into a special compressed air tank (not shown).

Should a breakdown prevent the first toggle levers 1040 from reaching their extended position, the torque generated by the assembly 1204 is counteracted by a counter torque which results in a stoppage of the counterclockwise pivoting movement of the lever 1064. The wheel 1092 mounted on lever arm 1082 will be spaced above the periphery of the cam plate 1084 and arm 1080 will be positioned downwardly from its position shown in FIG. 7. Thus, even though the switch 1226 is actuated by the tip 1228 of switching cam 1224, limit switch 1222 remains open and welding current from electrical control circuit 1230 will not be initiated. Preferably, by an appropriate circuit, switch 1222 is also arranged to shut down the machine drive in the event of breakdown.

Although the invention has been specifically illustrated and described herein with reference to preferred embodiments thereof, it is to be understood that minor modifications could be made without departing from the spirit of the invention.

What is claimed:

1. A chain welding machine for the resistance butt welding of interlinked chain links bent into the shape of a C, comprising a frame including a saddle for supporting the link to be welded, two guide supports inclined with respect to the horizontal for supporting the unwelded chain links which are interlinked with the chain link which is to be welded, two compression levers pivotable about parallel axes by means of a control shaft through at least one drive means, two tool carriers coupled to said compression levers for compression tools adapted to engage on the rounded portions of the chain link which is to be welded, said compression tools being movable in opposite directions as said compression levers are pivoted in opposition to each other, each of said tool carriers having one end which is remote from its respective compression tool and which is articulated on an outer end of a first leg of a two-legged first toggle lever which can be bent and stretched in a definite plane (F), said toggle lever having a second leg which has an outer end mounted for rotation about an axis which is perpendicular to said defined plane (F) on a bearing rigid with said frame and displaceable with respect to said bearing, said toggle lever being coupled by means of a connecting rod to a lever of a cam gear, said cam gear having a cam plate which is mounted on a driven control shaft and wherein each of said compression levers is coupled to said second leg of its associated first toggle lever, whereby rotation of said cam plate will cause pivotable reciprocation of said connecting rod in accordance with the configuration of said cam plate thereby causing alternate bending and stretching of said toggle lever to alternately advance said respective compression tool forward into engagement with a chain link which is to be welded and retract it therefrom.

2. Machine according to claim 1, wherein said legs of each of said first toggle lever are constructed as H-shaped double tie bars with forked ends.

3. Machine according to claim 2, wherein said outer forked ends of said first double tie rod are connected by a bolt to and receives an end of said tool carrier which is remote from said compression tools.

4. Machine according to claim 2, wherein said bearing rigid with said frame is an element of a rotary and thrust joint.

5. Machine according to claim 4, wherein said rotary and thrust joint has a journal which engages through an oblong hole constructed parallel with the guide direction of the tool carriers in said bearing, the length of the oblong hole corresponding to at least the compression stroke.

6. Machine according to claim 5, wherein each of said compression levers has two coincident flat parts carrying a shorter and a longer arm, said shorter arms being in each case articulated on a flat bar disposed substantially parallel with the guide direction of said tool carriers, the end of the flat bar which is remote from the associated shorter arm being disposed on the journal of the associated rotary and thrust joint.

7. Machine according to claim 6, wherein each compression lever forms the first leg of a second toggle lever, the second leg of which is constructed as a tie rod, said tie rod being articulated on a common slide member which is guided on two parallel rails disposed in said definite plane (F).

8. Machine according to claim 7, wherein said two flat parts of each compression lever are provided on their longer arms with a U-shaped bearing block connecting them and which forms a toggle joint with a journal mounted on said bearing block and extending through said tie rod of said second toggle lever.

9. Machine according to claim 8, further including a control cam gear as a means of driving said two compression levers and having a control cam plate mounted on the control shaft and a control lever operatively controlled thereby, the control lever carrying a rotatably mounted wheel which follows the periphery of the control cam plate, its other arm being spring loaded, and wherein articulated on the other spring loaded arm of the control lever there is a tie rod mounted on the slide member to pivot about an axis disposed in the guide plane.

10. Machine according to claim 9, further including means for limiting the travel of said slide member to the dimensioning of the predetermined minimum final distance between said two compression tools.

11. Machine according to claim 10, wherein disposed between said rails is a locked set screw, the head of which forms an abutment for said tie rod pivoted on said slide member.

12. Machine according to claim 2, wherein a toggle joint is formed by inner bifurcated ends of said two double tie bars and a bolt connected to said ends.

13. Machine according to claim 12, wherein said inner end of said second double tie bar engages around the inner end of the first double tie bar.

14. Machine according to claim 12, wherein said connecting rod is connected by articulated couplings to said toggle joint and said lever of said cam gear.

15. Machine according to claim 14, wherein said articulated couplings provided are rod-end ball and socket joints, the heads of which are disposed at the ends of said connecting rod and the ball parts of which are mounted on the bolt of said toggle joint in the plane of symmetry thereof.

16. Machine according to claim 1, wherein said connecting rod includes a turn buckle.

17. Machine according to claim 1, wherein said cam plate of said cam gear is constrained by shape to control said cam gear lever.

18. Machine according to claim 17, wherein said cam plate has an endless groove including oppositely disposed edges which are followed by a wheel mounted to rotate on said cam gear lever.

19. Machine according to claim 1, wherein said two compression levers are provided with a common drive means.

20. Machine according to claim 1, wherein the cam plate of the cam gear for operative control of the two-armed lever of the cam gear is constructed as a cam the periphery of which is followed by a wheel mounted to rotate on the forcibly moved arm of the lever and in that a single acting pneumatic cylinder-piston assembly is provided, the piston rod of which is disposed on the free arm of the lever of a cylinder of which is articulated on the machine frame, and in that the cylinder of the assembly is connected to a compressed air source of constant adjustable pressure and in that a limit switch is provided which can be actuated mechanically by the lever of the cam gear.

21. Machine according to claim 20, wherein said compressed air source comprises an adjustable pressure reducing valve.

22. Machine according to claim 21, wherein mounted on the control shaft is a switching cam which cooperates with the radially movable sensor of a stationary electric switch.

23. Machine according to claim 22, wherein said switching cam has a rounded tip.

24. Machine according to claim 23, wherein a common cam gear is provided for both first toggle levers.

25. Machine according to claim 24, wherein said common cam gear has, mounted on an auxiliary shaft, two levers coupled by the connecting rods to its associated toggle joint, one of the levers being of two-armed construction and being adapted for forcible movement by the single cam plate.

26. Machine according to claim 22 wherein said limit switch and said stationary electric switch are series connected through an electrical control circuit such that, when said switches are activated, a brief pulse is transmitted through said electrical control circuit to initiate welding current.

* * * * *